United States Patent Office 3,101,327
Patented Aug. 20, 1963

3,101,327
POLYMERIZATION OF 1-OLEFINS IN THE PRESENCE OF AN ALLYL HALIDE
Harold D. Lyons, Bartlesville, Okla., assignor to Phillips Petroleum Company, a corporation of Delaware
No Drawing. Filed Oct. 8, 1958, Ser. No. 765,934
8 Claims. (Cl. 260—88.2)

This invention relates to the preparation of olefin polymers. In one aspect, it relates to a process for preparing an olefin polymer having a desired melt index. In another aspect, it relates to a process for modifying the melt index of olefin polymers.

Reactions for polymerizing olefins are well known in the art and are generally carried out in the presence of cataylsts. One type of catalyst which has recently been proposed for the polymerization of monoolefins, such as ethylene or propylene, consists of a heavy metal compound, such as titanium tetrachloride, and an organometal compound, such as triethylaluminum. The polymer products obtained with such catalyst systems frequently have relatively low melt indices. Although such polymers can be satisfactorily utilized to form many articles by injection or compression molding, they are not entirely suitable for the injection molding of large items, such as waste baskets, garbage containers, laundry hampers, and the like. For such large items, polymers having higher melt indices than those ordinarily obtained are desirable.

It is an object of this invention, therefore, to provide a process for polymerizing olefins to polymers having a desired melt index.

Another object of the invention is to provide a process for modifying the melt index of olefin polymers.

A further object of the invention is to provide a process for improving the processability of olefin polymers.

Other and further objects and advantages of the invention will become apparent to those skilled in the art upon consideration of the accompanying disclosure.

The instant invention resides in the discovery that olefin polymers of a desired melt index can be obtained if the polymerization is carried out in the presence of certain unsaturated, halogen-containing compounds. Broadly speaking, in a process in which an olefin is polymerized in the presence of a catalyst comprising an organometal, the present invention resides in the improvement of conducting the polymerization in the presence of an unsaturated compound corresponding to the general formula RY in which R is an unsaturated hydrocarbon group, aliphatic or cycloaliphatic, containing from 2 to 6 carbon atoms and Y is a halogen. In these compounds, the unsaturated linkage in the unsaturated hydrocarbon group is in the alpha or beta position with respect to the halogen. It is preferred that the halogen contained in the unsaturated compound be one selected from the group consisting of chlorine, bromine, and iodine. It has been found that when the polymerization is carried out in the presence of the RY compound of this invention, the polymer product obtained has a much higher melt index than does the polymer produced in the absence of such compound.

The melt index of a polymer can be considered as a measure of the flow characteristics of the polymer under certain specified conditions. Also, the melt index gives an indication of the ease with which the polymer can be processed. Ordinarily, polymers produced in the presence of the catalyst systems described herein have a melt index less than 1.0. Polymers having a melt index as low as about 0.5 can usually be fabricated into numerous articles by injection or compression molding. However, in some cases, polymer products are obtained which have such low melt indices that they cannot be readily processed. By carrying out the polymerization in the presence of the added unsaturated compound of this invention, it is possible to increase the melt index of a polymer from any low value to a value such that the polymer can be satisfactorily used in the fabrication of any type of article. In a specific embodiment, the intant process is also applicable to increasing the melt index of a polymer which is suitable for certain uses but which cannot be readily employed in the fabrication of large articles. It is thus seen that the process of this invention can be employed to modify the melt index of polymer products to any desired degree. For example, the melt indices of polymers prepared under similar conditions can be increased from a value of zero to a value of 150 or higher or from any value in the aforementioned range to a higher value. A polymer having a melt index between 15 and 20 is particularly suitable for use in the manufacture of large items by injection molding. The degree to which the melt index of any particular polymer is modified will, in general, depend upon the amount of the unsaturated compound employed in the polymerization reaction. Usually, the amount used is in the range of 0.01 to 10.0 moles of the unsaturated compound per mol of the total catalyst components utilized in the polymerization. The actual amount of the unsaturated compound used will depend upon the degree to which it is desired to modify the melt index of the polymer.

Examples of unsaturated compounds corresponding to the formula RY which can be used in the practice of this invention include vinyl chloride, vinyl bromide, allyl chloride, allyl iodide, 1-butenyl chloride, 2-butenyl bromide, 2-chloro-1-propene, 2-bromo-1-propene, 1-chloro-2-methyl-1-propene, 1-chloro-1-propyne, 1-chloro-2-propyne, 1-cyclohexenyl chloride, 2-cyclopentenyl chloride, 2-cyclohexenyl chloride, 2-cyclohexenyl iodide, 1-chloro-3,3-dimethyl-1-butene, 1-chloro-2-hexene, 1-chloro-4-methyl-1-pentene, and the like.

The process of this invention is applicable to the polymerization of aliphatic 1-olefins containing from 2 to 8 carbon atoms. Examples of such materials include ethylene, propylene, 1-butene, 1-pentene, 1-hexene, 4-methyl-1-pentene, 1-octene, and the like. The process can also be employed in the copolymerization of such monomers so as to form copoylmers, e.g., copolymers of ethylene and propylene and copolymers of ethylene and 1-butene. The invention is particularly applicable to the polymerization of 1-olefins containing from 2 to 4 carbon atoms, and the preferred monomers are ethylene and propylene.

The polymerization catalyst employed in the process of this invention can in one embodiment be broadly defined as an organometal compound, e.g., a compound of a metal selected from the group consisting of aluminum, gallium, indium, and beryllium, having the valence linkages thereof individually bound to members selected from the group consisting of hydrogen, alkyl, cycloalkyl and aryl radicals. Examples of such compounds include Al(C$_6$H$_5$)$_3$, Al(CH$_3$)$_3$, HAl(C$_2$H$_5$)$_2$, H$_2$AlCH$_3$
Be(CH$_3$)$_2$, Ga(C$_3$H$_7$)$_3$, In(CH$_3$)$_3$, Be(C$_6$H$_5$)$_2$
Al(C$_6$H$_{13}$)$_3$, Ga(C$_6$H$_5$)$_3$ and the like. The instant invention is particularly applicable to a polymerization process which is conducted in the presence of a two or more component catalyst system wherein one component is an organometal compound, such as described above, including those where one or more, but not all, organo groups are replaced by a halogen, and the second component is a Group IV to VI or VIII (Mendeléeff's Periodic System) metal compound, e.g., a salt or alcoholate. The organometal compounds referred to include, without limitation, alkyl, cycloalkyl, or aryl compounds of di-, tri-, or tetravalent metals, particularly aluminum, gallium, indium, beryllium, magnesium, cadmium, mercury, zinc, barium, lead, and tin, or such organometal compounds where one or more, but not all, of the alkyl, cycloalkyl or aryl groups is replaced by a hydrogen atom and/or halogen atom. The organo groups can be quite large, compounds being applicable which have 15 or more carbon atoms in each alkyl, cycloalkyl or aryl group and 40 or more carbon atoms in the molecule. Specific examples of such organometal compounds include triethylaluminum, triisobutylaluminum, a mixture of diethylaluminum chloride and ethylaluminum dichloride, sometimes referred to as ethylaluminum sesquichloride, diethylaluminum hydride, ethylaluminum dichloride, or diethylaluminum chloride, taken alone, trioctylaluminum, tridodecylaluminum, triphenylaluminum, triphenylgallium, diphenylberyllium, dicyclohexylberyllium, cyclohexylzinc chloride, tetraphenyllead, tetraethyltin, and $CH_3AlCl$, $(C_4H_9)_2AlBr$, $C_8H_{17}AlI_2$, $(C_3H_7)_2GaF$
$(C_6H_{11})_2GaCl$ (cyclohexane derivative), $C_6H_5GaBr_2$, $C_{20}H_{41}GaBr_2$, $(C_{14}H_{29})_2GaF$, $(C_6H_5)_2InCl$, $C_8H_{17}InF_2$, $C_6H_{11}InBr_2$ (cyclohexane derivative), $C_{17}H_{35}BeI$, $CH_3BeBr$, and the like.

The compounds of a metal of Group IV to VI or VIII of the Periodic System include the oxides, hydrides, halides, oxyhalides, and salts of organic acids, usually having twenty or less carbon atoms, such as formic acid, of the Group IV to VI or VIII metals such as titanium, zirconium, chromium, thorium, molybdenum, vanadium, and iridium.

The alcoholates of a metal of Group IV of the Periodic System which can be employed conform to the formula $X_nM(OR')_m$, where $m+n$ equals the valence of the metal M and $m$ is at least one, X is a halogen, and R' is an organic radical usually having twenty or less carbon atoms, and preferably being an alkyl, cycloalkyl or aryl group. Specific examples of such alcoholates are titanium butoxide (tetra-n-butyl titanate), tetra-sec-butyl titanate, tetraisopropyl titanate, tetra-2-ethylbutyl titanate, tetra-2-ethylhexyl titanate, tetrastearyl titanate, tetraethyl titanate, tetra(chloroethyl)titanate, tetra-m-tolyl titanate, tetraallyl titanate, tetracyclohexenyl titanate, tetracyclopentyl titanate, tetraethyl zirconate, tetramethyl zirconate, tetraisopropyl zirconate, tetraamyl zirconate, dichlorodiethyl titanate $(Cl_2Ti(OC_2H_5)_2)$, monochlorotriethyl titanate $(ClTi(OC_2H_5)_3)$, and dichloro diethyl zirconate $(Cl_2Zr(OC_2H_5)_2)$. Also included are such compounds as $Hf(OCH_3)_4$, $Th(OC_3H_7)_4$, $Th(OC_6H_5)_4$
$Cl_3Ti(OC_6H_4OH_3)$, $Zr(OC_4H_7)_4$, $Cl_2Hf(OC_{10}H_{21})_2$
$Th(OC_6H_{13})_4$, and $Zr(OC_{12}H_{25})_4$ A third catalyst component which can be used is an organic halide or metal halide where the organic radical has thirty or less carbon atoms, and is an alkyl, cycloalkyl or aryl group. Specific examples are ethyl bromide, ethyl trichloro titanium, 1-bromobenzene, cyclohexyl chloride. Also applicable are an alkali metal or ammonium halide, an aluminum halide (where the catalyst also includes another metal compound such as a titanium compound), a hydrogen halide, a complex hydride, a mixture of an organic halide and a metal, and Grignard reagent.

The ratios of the catalyst components can vary widely, depending upon the particular charge used and operating conditions, say from 0.02 to 50 mols of the first component per mol of the second catalyst component. If a third component is present, the amount can vary from 0.02 to 50 mols per mol of the second component.

Examples of suitable catalyst systems in accordance with the foregoing disclosure are as follows:

(a) Aluminum trialkyls, e.g., triethylaluminum or triisobutylaluminum and the tetravalent metal halides of the type represented by titanium tetrachloride;

(b) A mixture of titanium hydride and an organometal compound exemplified by aluminum alkyl halide, i.e., a mixture of titanium hydride and ethylaluminum sesquichloride;

(c) Titanium dioxide and an organometal compound such as trialkylaluminum or aluminum alkyl chlorides, e.g., a mixture of titanium dioxide and ethylaluminum sesquichloride;

(d) A mixture of molybdenum pentachloride and organometal compounds and halides exemplified by triisobutylaluminum or triethylaluminum and ethylaluminum dichloride;

(e) A mixture of complex metal halides, exemplified by potassium fluotitanate, and an organometal compound and halides exemplified by triethylaluminum and diethylaluminum chloride;

(f) A mixture of a derivative selected from the oxides of molybdenum, alkali metal and ammonium molybdates, and an organometal compound or halide exemplified by triisobutylaluminum and isobutylaluminum dichloride;

(g) A mixture of a derivative of iridium, platinum and osmium selected from the group consisting of halides, oxides and complex compounds of iridium, platinum and osmium, said complex compounds corresponding to the formula $M_xM'X_y$, wherein M is an alkali metal or an ammonium radical, M' is irridium, platinum or osmium, X is a halogen, and $y$ is at least 1 and the sum of $x$ and $y$ is equal to the valence of M' and a metallic organic compound exemplified by triethylaluminum, for example, iridium chloride and triethylaluminum or ethylaluminum sesquichloride;

(h) At least one derivative selected from the group consisting of oxides, halides, and oxyhalides of vanadium and complex salts of said halides with a member selected from the group consisting of ammoniun halide and an alkali metal halide, and an organometal compound exemplified by triethylaluminum, for example, vanadium oxide and triethylaluminum;

(i) A mixture of a derivative of a Group VI metal selected from the group consisting of halides, oxyhalides, hydroxyhalides, oxyhydroxyhalides of a metal selected from the group consisting of molybdenum, tungsten, uranium, selenium, tellurium, and polonium, and complex salts of said halides and said oxyhalides with a member selected from the group consisting of halides of sodium, potassium, lithium, rubidium, cesium and ammonia and an organometal compound exemplified by triethylaluminum, for example, molybdenum pentachloride and ethylaluminum dichloride;

(j) A chromyl halide and an organometal compound;

(k) (1) A hydrocarbon derivative of one of the metals, zinc, cadmium, mercury, and magnesium, and (2) a member selected from the group consisting of halides of titanium, zirconium, vanadium, and molybdenum, oxyhalides of titanium, zirconium, vanadium, molybdenum and chromium, and complex salts of said halides and oxyhalides with a member selected from the group consisting of halides of the alkali metals and ammonia, for example, diethylzinc and titanium tetrachloride;

(l) (1) An organo derivative of a Group IV-A metal, (2) a hydride or organo compound of a metal of Groups II to VIII, inclusive, and (3) a hydrogen halide, for example, triethylaluminum, titanium butoxide, and hydrogen chloride;

(m) (1) A tri- or tetrahalide of titanium, zirconium, hafnium and germanium, (2) an organophosphorus-containing compound, and (3) an organometal halide;

(n) (1) A tri- or tetrahalide of titanium, zirconium, hafnium and germanium, (2) a peroxide of the formula R"OOR" where R" is hydrogen, alkyl, aralkyl, alkaryl, cycloalkyl, acyl, alkyne, or aryl, and (3) an organometal halide; for example, ethylaluminum sesquichloride, titanium tetrachloride and benzoyl peroxide.

(o) (1) A tri- or tetrahalide of titanium, zirconium, hafnium and germanium, (2) a metal alkoxide, and (3) an organometal halide; for example, ethylaluminum sesquichloride, aluminum ethylate and titanium tetrachloride; and (p) (1) A halide of titanium, zirconium, hafnium, or germanium, (2) carbides and acetylenic compounds, and (3) an organometal halide; for example, ethylaluminum sesquichloride, titanium tetrachloride, and copper acetylide.

Although the polymerization can be conducted in the gaseous phase, it is usually carried out in the presence of a hydrocarbon diluent which is relatively inert and liquid under conditions of the process and does not have a deleterious effect on the catalyst. Suitable diluents include paraffinic, cycloparaffinic and/or aromatic hydrocarbons. Examples of such diluents include propane, butane, pentane, hexane, cyclohexane, methylcyclohexane, benzene, toluene, the xylenes, and the like. The relative amounts of diluent and olefin employed in the polymerization depend on the particular conditions and techniques used and are generally governed by the capacity of the apparatus to effect suitable agitation and heat removal. In general, the total olefin content of the feed mixture charged to the polymerization reactor is in the range of 0.5 to 10 weight percent, based on olefin and diluent.

The polymerization can be carried out at temperatures varying over a rather broad range, for example, from 100 to 500° F. However, it is usually preferred to conduct the reaction at a temperature in the range of 150 to 350° F. While lower temperatures than those mentioned can be employed, yields at such lower temperatures are often quite low and longer reaction times are required. Although pressures ranging from atmospheric and below up to 30,000 p.s.i.g. or higher can be utilized, a pressure in the range of 50 to 1500 p.s.i.g. is usually preferred. In general, pressures are satisfactory which are sufficient to maintain the reaction mixture substantially in the liquid phase The process of this invention can be carried out as a batch process by pressurizing the olefin to be polymerized into a reactor containing the catalyst, the unsaturated RY compound, and diluent, if the latter is used. Furthermore, the process can be carried out continuously by maintaining the above-described concentrations of reactants in the reactor for a suitable residence time. The residence time used in a continuous process can vary widely since it depends to a great extent upon the temperature at which the process is conducted. The residence time also varies with the specific olefin that is to be polymerized. However, the residence time in a continuous process generally falls within the range of one second to an hour or more. In a batch process, the time for the reaction can also vary widely, such as from about 15 minutes to about 3 hours or more. By charging the olefin feed in increments, the length of a run can be extended, if desired, for longer periods of time.

It has been found that various materials in some instances may have a tendency to inactivate the catalyst compositions of this invention. These materials include carbon dioxide, oxygen and water. Therefore, it is usually desirable to free the polymerizable hydrocarbon from these materials, as well as from other materials which may tend to inactivate the catalyst before contacting the hydrocarbon with the catalyst. Any of the known means for removing such contaminants can be employed. When a diluent is used in the process, this material also should generally be freed of contaminants, such as water, oxygen, and the like. It is desirable, also, that the air and moisture be removed from the reaction vessel before the reaction is carried out. However, in some cases, small amounts of catalyst inactivating materials, such as oxygen and water, can be tolerated in the reaction mixture while still obtaining reasonably good polymerization rates. It is to be understood that the amount of such materials present in the reaction mixture shall not be sufficient to completely inactivate the catalyst.

At the completion of the polymerization reaction, any excess olefin is vented and the contents of the reactor, including the solid polymer swollen with diluent, are then treated to inactivate the catalyst and remove the catalyst residues. The inactivation of the catalyst can be accomplished by washing with an alcohol, water or other suitable material. In some instances, the catalyst inactivating treatment also removes a major proportion of the catalyst residues while in other cases, it may be necessary to treat the polymer with an acid base or other suitable material in order to effect the desired removal of the catalyst residues. The treatment of the polymer may be carried out in a comminution zone, such as a Waring Blendor, so that a finely divided polymer is thereby provided. The polymer is then separated from the diluent and treating agents, e.g., by decantation, filtration, or absorption, after which the polymer is dried. The diluent and treating agents can be separated by any suitable means, e.g., by fractional distillation, and reused in the process.

A more complete understanding of the invention can be obtained by referring to the following illustrative examples which are not intended, however, to be unduly limitative of the invention.

EXAMPLE I

Two runs were made in which propylene and ethylene were copolymerized using a charge ratio (weight basis) of 95:5. The catalyst system consisted of titanium trichloride and triisobutylaluminum (TBA), which was charged in a mol ratio of 1:11. In one of the runs (run B), one milliliter (0.938 gram) of allyl chloride was added to the catalyst prior to the charging the monomers. In the other run (run A), which constituted a control, no allyl chloride was added to the catalyst.

In each run, the solvent cyclohexane was charged to the reactor first. The reactor was flushed with nitrogen during addition of the catalyst, the titanium trichloride being introduced first followed by the triisobutylaluminum, the latter as a solution in cyclohexane (0.15 gm./ml.). In run B, the allyl chloride was then added. The reactors were then sealed, after which the monomers were charged.

In run B, which was conducted in a 1-liter stainless steel reactor, the entire charge of monomers was accomplished at one time. In run A, a 1-gallon stainless steel reactor was used, and the monomers were added in four increments. In each of the runs, the temperature was raised by passing steam through the reactor jackets until the reactions were initiated, after which the polymerizations were maintained by the exothermic heat of the reactions. Progress of the polymerization was indicated by observations of the pressure drop in the reactors. Temperatures during the reactions were in the range of 225 to 260° F., usually being at about 250° F.

When all the monomers had been charged, and there was no pressure drop or the rate of change of pressure was very slow, the reactors were cooled by passing cold water through the reactor jackets. The reactors were then opened, and the polymer removed and comminuted with an excess of methyl alcohol in a Waring Blendor. The polymer was recovered by filtration.

The recipes employed in the runs as well as certain operating data are shown hereinbelow in Table I.

*Table I*

|  | Run A | Run B |
|---|---|---|
| Propylene, grams | [1] 475 | 95 |
| Ethylene, grams | [1] 25 | 5 |
| Ti Cl₃: |  |  |
|   Grams | 0.6 | 0.6 |
|   Millimoles | 3.88 | 3.88 |
| TBA: |  |  |
|   Grams | 8.4 | 8.4 |
|   Millimoles | 42.5 | 42.5 |
| Allyl chloride: |  |  |
|   Grams | None | 0.938 |
|   Millimoles | None | 12.2 |
| Cyclohexane, ml | 1,500 | 400 |
| Temperature, ° F. maximum | 253 | 260 |
| Yield, grams | 425 | 81 |
| Yield, percent | 85 | 81 |

[1] Added in four increments.

Various physical properties of the polymers produced in runs A and B are set forth below in Table II. Dashes in the table indicate that the particular properties were not determined.

Table II

|  | Run A | Run B |
|---|---|---|
| Ash, percent | 0.43 | |
| Melt index [1] | 1.309 | 4.92 |
| Density, gm./cc. at room temperature | 0.889 | 0.897 |
| Impact strength, Izod, ft. lbs./in. notch [2] | a 10.88 | 9.89 |
| Stiffness, p.s.i. [3] | 26,000 | 24,000 |
| Shore D hardness [4] | 45 | |
| Flex temperature, °F. [5] | −7 | −6 |
| Heat distortion temperature, °F. [6] | 124 | |
| Tensile strength at yield, p.s.i.: | | |
|   Compression molded [7] | 1,540 | 1,600 |
|   Injection molded [8] | 2,535 | |
| Tensile at break: | | |
|   Compression molded [7] | 2,348 | 1,388 |
|   Injection molded [8] | 2,426 | |
| Elongation at break: | | |
|   Compression molded [7] | 783 | 193 |
|   Injection molded [8] | 167 | | a No break.
[1] Determined by method of ASTM D-1238-52T. Modified by taking 5 samples at 2 minute intervals, averaging the 5 values (weights), discarding any values which deviate from the average by more than 5% (by weight), reaveraging and multiplying by 5 to obtain the amount of polymer extruded in 10 minutes. The melt index is defined as the grams of polymer extruded in 10 minutes through an 0.0825 inch orifice at 190° C. when subjected to a load of 2160 grams.
[2] Determined by method of ASTM D-256-54T (K″ bar).
[3] Determined by method of ASTM D-747-50.
[4] Determined by method of ASTM D-676-55T.
[5] Determined by method of ASTM D-1043-51.
[6] Determined by method of ASTM D-648-45T.
[7] Determined by method of ASTM D-412-51T.
[8] Determined by method of ASTM D-638-52T.

EXAMPLE II

Two runs were made in which ethylene was used as the monomer and the catalyst system consisted of triisobutylaluminum (TBA) and titanium tetrachloride. To the catalyst in one of the runs (run D), there was added 0.938 gram of allyl chloride. The runs were carried out in a 1200 ml. stainless steel rocking autoclave. Solvent was charged to the reactor after which the catalyst was charged while flushing with nitrogen. The titanium tetrachloride was added first, followed by the triisobutylaluminum, the latter as a solution in cyclohexane. In run D, the allyl chloride was added after introduction of the catalyst components. The reactor was then sealed, and the system was pressured with ethylene to 300 p.s.i.g. The reactor was heated until polymerization was initiated, and the reaction thereafter proceeded exothermically. The recipes used in these runs and certain operating conditions are shown below in Table III.

Table III

|  | Run C | Run D |
|---|---|---|
| Cyclohexane, ml | 400 | 400 |
| TiCl₄: | | |
|   Gram | 1.0 | 1.0 |
|   Millimoles | 5.1 | 5.1 |
| TBA: | | |
|   Grams | 3.0 | 3.0 |
|   Millimoles | 6.5 | 6.5 |
| Allyl chloride: | | |
|   Gram | None | 0.938 |
|   Millimoles | None | 12.2 |
| Temperature, °F. maximum | 175 | 165 |
| Pressure, p.s.i. | 400 | 325 |
| Allyl chloride: Grams | 0.75 | 0.67 |
| Yield, grams | 49 | 42 |
| Drying conditions, °F., (vac.) | 120 | 120 |

The polymer products from runs C and D were evaluated and the results of the evaluations are set forth hereinbelow in Table IV.

Table IV

|  | Run C | Run D |
|---|---|---|
| Inherent viscosity [1] | 10.17 | 0.74 |
| Melt index [2] | 0.05 | 132.33 |
| Density, gm./cc. at room temperature | .9415 | .9595 |
| Crystalline freeze point [3] | 247±1 | 249±1 |
| Shore D hardness [4] | 65 | 68 |

[1] Determined by method of Kemp et al,. Ind. & Eng. Chem. 35, 1108 (1943).
[2] In run D, determined by method described in footnote 1 under Table II. In run C, also determined by this method except that 9.6 times the normal load was used, the value given representing a high load melt index.
[3] Determined by melting a sample of the polymer, inserting a thermocouple into the molten polymer, and allowing the molten polymer to cool slowly. The temperature is recorded and plotted on a chart versus time. The crystalline freeze point is the midpoint of the first plateau in the time vs. temperature curve.
[4] See footnote 4 under Table II.

From a consideration of the data in the foregoing examples, it is seen that the addition to the polymerization systems of an unsaturated compound of the formula RY, as described herein, such as allyl chloride, made it possible to increase the melt index of the polymers without adversely affecting the other properties of the polymers. In the case of runs A and B, which were carried out under similar conditions, the melt index of the copolymer products was increased from 1.309 to 4.92. In runs C and D, also conducted under similar conditions, the melt index of the ethylene polymer was increased from 0.05 (high load) to 132.33.

The polymers produced in accordance with this invention have utility in applications where solid plastics are used. They can be used to impregnate and fabricate, and they can be used to form articles of any desired shape, such as bottles and other containers for liquid. Certain of the products of this invention can be advantageously employed in the injection molding of large items, such as waste baskets, garbage containers, laundry hampers, and the like.

It will be apparent to those skilled in the art that variations and modifications of the invention can be made upon study of the foregoing disclosure. Such variations and modifications are believed to come within the spirit and scope of the invention.

I claim:

1. In a process for polymerizing aliphatic 1-olefins containing 2 to 8 carbon atoms wherein the 1-olefin is contacted in a reaction zone with a catalyst which forms on mixing (1) an alkylaluminum compound containing up to 15 carbon atoms in each alkyl group and up to 40 carbon atoms per molecule and selected from the group consisting of trialkylaluminum compounds and alkylaluminum halides, and (2) a titanium halide, at a temperature in the range of 100 to 500° F. and a pressure sufficient to maintain the reaction mixture in the liquid phase, the improvement which comprises adding to said reaction zone 0.01 to 10 mols of allyl halide per mol of said alkylaluminum compound and titanium halide.

2. The process of claim 1 wherein said titanium halide is a titanium chloride.

3. The process of claim 1 wherein said 1-olefin is propylene, said alkylaluminum compound is diethylaluminum chloride and said titanium halide is titanium trichloride.

4. In a process for producing a polymer of ethylene in which ethylene is contacted in the presence of a hydrocarbon diluent with a catalyst which forms on mixing components consisting essentially of triisobutylaluminum and titanium chloride at a temperature in the range of 150 to 350° F. and at a pressure sufficient to maintain said diluent in the liquid phase, the improvement which comprises contacting said ethylene with said catalyst in the presence of 0.01 to 10.0 moles of allyl chloride per mole of said total catalyst.

5. The process according to claim 4 in which said titanium chloride is titanium trichloride.

6. In a process for producing a copolymer of ethylene and propylene by contacting ethylene and propylene in the presence of a hydrocarbon diluent with a catalyst which forms on mixing components consisting essentially of triisobutylaluminum and titanium trichloride at a temperature in the range of 150 to 350° F. and at a pressure sufficient to maintain said diluent in the liquid phase, the improvement which comprises adding to the reaction mixture from 0.1 to 10.0 mols of allyl chloride per mol of said total catalyst.

7. In a process for polymerizing aliphatic 1-olefins containing 2 to 8 carbon atoms wherein the 1-olefin is contacted in a reaction zone with a catalyst which forms on mixing a trialkyl aluminum compound containing up to 15 carbon atoms in each alkyl group and up to 40 carbon atoms per molecule and titanium tetrachloride at a temperature in the range of 100 to 500° F. and a pressure sufficient to maintain the reaction mixture in the liquid phase, the improvement which comprises adding to said reaction zone 0.01 to 10 moles of allyl halide per mol of said trialkyl aluminum and titanium tetrachloride.

8. In a process for producing a polymer of ethylene in which ethylene is contacted in the presence of a hydrocarbon diluent with a catalyst which forms on mixing components consisting essentially of triisobutylaluminum and titanium tetrachloride at a temperature in the range of 150 to 350° F. and at a pressure sufficient to maintain said diluent in the liquid phase, the improvement which comprises contacting said ethylene with said catalyst in the presence of 0.01 to 10.0 moles of allyl chloride per mol of said total catalyst.

References Cited in the file of this patent

UNITED STATES PATENTS

| | | |
|---|---|---|
| 2,886,561 | Reynolds | May 12, 1959 |
| 2,944,048 | Nowlin et al. | July 5, 1960 |
| 3,029,231 | Amerongen | Apr. 10, 1962 |

FOREIGN PATENTS

| | | |
|---|---|---|
| 533,362 | Belgium | May 16, 1955 |
| 1,144,316 | France | Apr. 23, 1957 |
| 1,153,323 | France | Sept. 30, 1957 |